US006983794B2

(12) United States Patent
Fujimoto

(10) Patent No.: US 6,983,794 B2
(45) Date of Patent: Jan. 10, 2006

(54) HEAT EXCHANGER UNIT

(75) Inventor: Toru Fujimoto, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 172 days.

(21) Appl. No.: 10/250,759

(22) PCT Filed: Nov. 1, 2002

(86) PCT No.: PCT/JP02/11479

§ 371 (c)(1),
(2), (4) Date: Jul. 8, 2003

(87) PCT Pub. No.: WO03/042602

PCT Pub. Date: May 22, 2003

(65) Prior Publication Data

US 2004/0177627 A1 Sep. 16, 2004

(30) Foreign Application Priority Data

Nov. 14, 2001 (JP) ............................. 2001-349058

(51) Int. Cl.
*F24F 7/08* (2006.01)
*F24F 7/007* (2006.01)
(52) U.S. Cl. ...................... 165/231; 165/232; 165/233; 165/54
(58) Field of Classification Search .................. 165/54, 165/231, 232, 233
See application file for complete search history.

(56) References Cited

U.S. PATENT DOCUMENTS 4,971,137 A * 11/1990 Thompson .................. 165/276
5,632,334 A * 5/1997 Grinbergs et al. .......... 165/232
6,176,305 B1 * 1/2001 Haglid ....................... 165/231

FOREIGN PATENT DOCUMENTS

| JP | 5-141737 A | | 6/1993 |
| JP | 05-157299 | | 6/1993 |
| JP | 08105642 A | * | 4/1996 |
| JP | 09-047622 | | 2/1997 |
| JP | 10-122615 | | 5/1998 |
| JP | 10-227513 | | 8/1998 |
| JP | 10-281525 A | | 10/1998 |
| JP | 11-141947 A | | 5/1999 |
| JP | 11304206 A | * | 11/1999 |
| JP | 2000171069 A | * | 6/2000 |
| JP | 2003-074937 | | 3/2003 |

* cited by examiner

*Primary Examiner*—John K. Ford
(74) *Attorney, Agent, or Firm*—Shinjyu Global IP Counselors, LLP

(57) ABSTRACT

The present invention provides a heat exchanger unit that can appropriately inhibit freezing of a heat exchange element even in cold climates. The heat exchanger unit performes heat exchange and ventilation between an indoor space and an outdoor space, and is provided with a heat exchange element, a supply air passage and an exhaust air passage that are routed via the heat exchange element, a temperature sensor, and a control unit. The temperature sensor detects the outside air temperature. The control unit executes a first freeze inhibit control mode, which inhibits freezing of the heat exchange element, if the outside air temperature falls below a first level, and a second freeze inhibit control mode, which inhibits freezing of the heat exchange element more strongly than the first freeze inhibit control mode, if the outside air temperature falls below a second level, which is lower than the first level.

3 Claims, 4 Drawing Sheets

HEAT EXCHANGER UNIT

TECHNICAL FIELD OF THE INVENTION

The present invention relates to a heat exchanger unit, and more particularly to a heat exchanger unit for cold-climate regions that performs heat exchange and ventilation, and is arranged between an indoor space and an outdoor space.

RELATED ART

The methods used in recent years for indoor ventilation, in which air conditioning is performed for heating and cooling, have included one that aims to reduce the operating expense of an air conditioner for heating and cooling by exchanging heat between the supply air (outside air) supplied to an indoor space and the conditioned air (return air, exhaust air) exhausted from the indoor space.

A heat exchanger unit is one example of an apparatus that performs heat exchange and ventilation. Heat exchanger units are installed to ventilate buildings and various facilities, and include those linked with an air conditioner and those that operate independently. As shown in FIG. 1, the heat exchanger unit is installed in places such as above the ceiling of an indoor space SI that is to be ventilated. The heat exchanger unit 5 shown in FIG. 1 exchanges heat between the return air RA from the indoor space SI and the outside air OA by a heat exchange element 11 in a casing 10, discharges the return air RA to the outdoor space SO (exhaust air EA), and then delivers post heat-exchanged outside air OA into the indoor space SI as supply air SA. For example, if the indoor space SI is cooled in summertime to 26° C. by an air conditioner 20, the heat exchanger unit exchanges heat between the 26° C. return air RA and the 32° C. outside air OA by the heat exchange element 11, operates the supply air fan 12, inserts the 27.4° C. supply air SA into the indoor space SI, operates the exhaust air fan 13, and discharges the 30.6° C. exhaust air EA into the atmosphere (outdoor space SO). Thereby, the operation duty cycle of the air conditioner 20 decreases, and energy consumption can be reduced.

However, the heat exchanger unit 5 does not always exchange heat; rather, in cases where not exchanging heat would save energy, such as when performing cooling when the indoor space SI air temperature is higher than the outdoor space SO air temperature (hereinafter, the "outside air temperature"), the heat exchanger unit 5 can perform ordinary ventilation, wherein outside air is taken in without exchanging heat. Although omitted from FIG. 1, the heat exchanger unit 5 is provided with a bypass passage that is used when performing ordinary ventilation instead of performing heat exchange and ventilation. A damper (not shown) switches between the bypass passage and the passage that passes through the heat exchange element 11.

In addition, the heat exchanger unit 5 is equipped with two temperature sensors 51, 52 for judging whether to perform heat exchange and ventilation, or ordinary ventilation. As shown in FIG. 2, the temperature sensor 52 is arranged at a location where it can detect the temperature of the return air RA before it passes through the heat exchange element 11, i.e., the indoor temperature. In addition, the temperature sensor 51 is arranged at a location where it can detect the temperature of the outside air OA before it passes through the heat exchange element 11, i.e., the outside air temperature.

As an example of the specifications of the heat exchanger unit as described above, the outside air temperature specification is set to a range of −10°–40° C. Furthermore, if such a heat exchanger unit is used in an environment where the outside air temperature falls below −10° C., condensed water may freeze at the heat exchange element. In addition, dew condensation may form inside the unit.

To inhibit freezing of the heat exchange element in this manner, when the outside air temperature fell below a predetermined level (e.g., −10° C.), conventional heat exchanger units executed an intermittent operation control mode by intermittently stopping the supply air fan and running with just the exhaust air. When operating with just the exhaust air, only the return air discharged from the indoor space to the outdoor space would flow to the heat exchange element, and the cold outside air, at a temperature below −10° C., would for the most part no longer pass through the heat exchange element. Because the indoor temperature is maintained at a relatively high temperature when the outside air temperature falls below −10° C., the heat from the return air would be stored in the heat exchange element when running with just the exhaust air, thereby relieving the condition in which the heat exchange element was about to freeze due to the outside air.

However, in cold-climate regions where the cold is severe, it is also conceivable that, after falling below −10° C., the outside air temperature could fall further to −15° to −20° C. In such an environment, it may not be possible to completely inhibit freezing of the heat exchange element just by executing a fixed intermittent operation control mode when the temperature falls below a predetermined level, as is done conventionally.

DISCLOSURE OF THE INVENTION

The object of the present invention is to provide a heat exchanger unit that can appropriately inhibit freezing of the heat exchange element even in cold-climate regions.

A heat exchanger unit according to a first aspect of the present invention is arranged between an indoor space and an outdoor space, and can perform heat exchange and ventilation. The heat exchanger unit is provided with a heat exchange element; a supply air passage that is routed via the heat exchange element; an exhaust air passage that is routed via the heat exchange element; a temperature sensor; and a control unit. The temperature sensor detects the outside air temperature, which is the air temperature of the outdoor space. The control unit executes a first freeze inhibit control mode and a second freeze inhibit control mode. The first freeze inhibit control mode inhibits freezing of the heat exchange element if the outside air temperature falls below a first level. The second freeze inhibit control mode inhibits freezing of the heat exchange element if the outside air temperature falls below a second level (which is lower than the first level). The second freeze inhibit control mode inhibits freezing of the heat exchange element more strongly than the first freeze inhibit control mode.

Herein, air can be supplied from the outdoor space to the indoor space via the supply air passage, and air can be discharged from the indoor space to the outdoor space via the exhaust air passage. Further, because the supply air passage and the exhaust air passage are both routed via the heat exchange element, heat is exchanged between the supply air and the exhaust air in the heat exchange element.

Furthermore, the control unit monitors the outside air temperature detected by the temperature sensor; as in the conventional art, when outside air temperature falls below a predetermined level (first level), the first freeze inhibit control mode is executed, wherein freezing of the heat exchange element is inhibited; and when the outside air temperature falls below the second level, which is lower than the first level, the second freeze inhibit control mode is executed, which more strongly inhibits freezing. Accordingly, after the temperature falls below the first level in a cold-climate region, even if the outside air temperature unfortunately falls further to the temperature at which freezing of the heat exchange element would be insufficiently inhibited (second level) with just the first freeze inhibit control mode, when the outside air temperature falls below the second level the second freeze inhibit control mode is executed, which strengthens the effect of inhibiting freezing of the heat exchange element.

In this manner, in addition to the first freeze inhibit control mode that executes when the outside air temperature falls below the first level, a second freeze inhibit control mode has been newly provided that executes when the outside air temperature falls below the second level; consequently, the present heat exchanger unit is able to appropriately inhibit freezing of the heat exchange element even in cold-climate regions.

The heat exchanger unit according to a second aspect of the present invention is the heat exchanger unit according to the first aspect of the present invention, further provided with a supply air fan incorporated in the supply air passage; and an exhaust air fan incorporated in the exhaust air passage. Further, the control unit intermittently operates the supply air fan in the first freeze inhibit control mode and in the second freeze inhibit control mode. The percentage of halt time during intermittent operation in the second freeze inhibit control mode is greater than that during intermittent operation in the first freeze inhibit control mode.

Herein, the supply air fan is intermittently operated by temporarily stopping the fan for a predetermined percentage of time in the first freeze inhibit control mode and the second freeze inhibit control mode. While the supply air fan is stopped, the supply air stops and only exhaust air flows by the exhaust air fan; therefore, only the warm return air of the indoor space passes through the heat exchange element, and the cold outside air no longer passes through the heat exchange element. Accordingly, the heat exchange element stores heat when the supply air fan stops; when the supply air and exhaust air flow by the action of both fans, freezing of the heat exchange element, which is cooled by the outside air, is inhibited.

Furthermore, with intermittent operation in the second freeze inhibit control mode executed when the outside air temperature falls below the second level, which is lower than the first level, the percentage of time that the supply air fan is stopped is greater than that of intermittent operation in the first freeze inhibit control mode. Consequently, even if there is an increased risk of the outside air temperature falling below the second level and the heat exchange element freezing, freezing of the heat exchange element will be inhibited because the time in which the heat exchange element is cooled by the outside air (the time that the supply air fan is operating) will shorten.

The heat exchanger unit according to a third aspect of the present invention is the heat exchanger unit according to the second aspect of the present invention, wherein the control unit further performs intermittent operation of the exhaust air fan in the second freeze inhibit control mode.

Herein, in the second freeze inhibit control mode, intermittent operation of the exhaust air fan is performed in addition to intermittent operation of the supply air fan. In other words, in the second freeze inhibit control mode, there is a time span when both the supply air fan and the exhaust air fan are temporarily stopped. Because ventilation is no longer being performed and both the supply air and exhaust air are stopped during this time span, the temperature of the indoor space rises. Thus, by stopping the supply air and exhaust air, and raising the temperature of the indoor space, freezing of the heat exchange element is inhibited by the subsequent exhaust air.

Furthermore, if the supply air is stopped and just the exhaust air flows, entry of the outside air of the outdoor space into the indoor space through a gap prevents the indoor temperature from rising; consequently, the enhanced effect of inhibiting freezing cannot be obtained as when both the supply air and exhaust air are stopped.

In this manner, because it is possible to create a condition in the second freeze inhibit control mode wherein both the supply air and exhaust air are temporarily stopped, which has a strong effect in inhibiting freezing of the heat exchange element, freezing of the heat exchange element is effectively achieved.

The heat exchanger unit according to a fourth aspect of the present invention is the heat exchanger unit according to the first aspect of the present invention, further provided with a supply air fan incorporated in the supply air passage; and an exhaust air fan incorporated in the exhaust air passage. Furthermore, the control unit intermittently operates the supply air fan in the first freeze inhibit control mode, and intermittently operates the supply air fan and the exhaust air fan in the second freeze inhibit control mode.

Herein, only the supply air fan is intermittently operated when the outside air temperature falls below the first level (first freeze inhibit control mode), and both the supply air fan and the exhaust air fan are operated intermittently when the outside air temperature falls below the second level (second freeze inhibit control mode). Because a time span arises in the second freeze inhibit control mode in which both the supply air and the exhaust air are stopped, the temperature of the indoor space rises, and freezing of the heat exchange element is effectively inhibited by the comparatively warm return air passing through the heat exchange element when the exhaust air subsequently flows.

The heat exchanger unit according to a fifth aspect of the present invention is the heat exchanger unit according to any one of the second through 4 fourth aspects of the present invention, further provided with a casing. The casing has a first inlet and a second outlet on the outdoor space side, and a second inlet and a first outlet on the indoor space side. In addition, the casing houses the heat exchange element. The supply air passage extends in the casing from the first inlet to the second inlet via the heat exchange element. The exhaust air passage extends in the casing from the first outlet to the second outlet via the heat exchange element. Furthermore, the temperature sensor is arranged between the first inlet of the supply air passage and the heat exchange element.

Herein, because a temperature sensor is provided in the supply air passage, in particular between the first inlet on the outdoor space side and the heat exchange element, the temperature sensor can be made to detect the outside air temperature.

A heat exchanger unit according to a sixth aspect of the present invention is arranged between the indoor space and the outdoor space, and can perform heat exchange and ventilation. The present heat exchanger unit is provided with a heat exchange element, a supply air passage, an exhaust air passage, a temperature sensor, and a control unit. The supply air passage is provided to supply air, and is routed via the heat exchange element. The exhaust air passage is provided to exhaust air, and is routed via the heat exchange element. The temperature sensor is provided to detect the temperature of a portion of the heat exchange element on the downstream side of the exhaust air flow. This temperature sensor may be one that directly detects the temperature of the portion of the heat exchange element on the downstream side of the exhaust air flow, or may be one that detects the temperature of the exhaust air that passed through the heat exchange element. The control unit executes a first freeze inhibit control mode, which inhibits freezing of the heat exchange element if the temperature detected by the temperature sensor falls below a first level; and executes a second freeze inhibit control mode, which inhibits freezing of the heat exchange element more strongly than the first freeze inhibit control mode, if the temperature detected by the temperature sensor falls below a second level, which is lower than the first level.

Because the humidity of the indoor space is generally higher than the outdoor space, a freezing phenomenon occurs at the portion of the heat exchange element on the downstream side of the exhaust air flow (the portion nearer to the outdoor space having a low air temperature) if the heat exchange element, which forms a portion of the supply air passage and the exhaust air passage, freezes. In contrast, in the conventional art, the judgment about whether to perform operations that inhibit freezing of the heat exchange element is made by detecting the temperature of the outside air that passes through the supply air passage and comparing that temperature to a predetermined level. Nevertheless, because the conventional art is unable to judge based only on the outside air temperature whether the heat exchange element will freeze, it is therefore preferable to make such judgments based on the temperature of the portion of the heat exchange element on the downstream side of the exhaust air flow, i.e., the portion that tends to freeze easily.

Taking this into consideration, a temperature sensor is arranged herein in order to detect the temperature of the portion of the heat exchange element on the downstream side of the exhaust air flow. Accordingly, rather than the conventional technique that estimates the risk of freezing of the heat exchange element based on the outside air temperature, the risk of freezing of the heat exchange element can be judged based on the temperature of the portion of the heat exchange element on the downstream side of the exhaust air flow, i.e., the portion that is expected to freeze first.

Enabling the risk of freezing of the heat exchange element to be judged more accurately in this manner reduces malfunctions like switching to freeze inhibit operation when not needed, or not starting freeze inhibit operation (freeze inhibit control mode) despite the fact that the heat exchange element is freezing, thus enabling freezing of the heat exchange element to be appropriately inhibited in cold-climate regions.

Furthermore, the control unit herein monitors the temperature detected by the temperature sensor; when that detected temperature falls below a predetermined level (first level), the first freeze inhibit control mode is executed, wherein freezing of the heat exchange element is inhibited; and when the detected temperature falls below the second level, which is lower than the first level, the second freeze inhibit control mode is executed, which more strongly inhibits freezing. Accordingly, after the temperature falls below the first level in a cold-climate region, even if the temperature of the portion of the heat exchange element on the downstream side of the exhaust air flow unfortunately falls as far as the temperature (second level) at which freezing of the heat exchange element is insufficiently inhibited with just the first freeze inhibit control mode, when that temperature falls below the second level the second freeze inhibit control mode is executed, which strengthens the effect of inhibiting the freezing of the heat exchange element.

In this manner, in addition to the first freeze inhibit control mode that executes when the temperature detected by the temperature sensor falls below the first level, a second freeze inhibit control mode is provided that executes when the detected temperature falls below the second level; consequently, the present heat exchanger unit can appropriately inhibit freezing of the heat exchange element even in cold-climate regions.

The heat exchanger unit according to a seventh aspect of the present invention is the heat exchanger unit according to the sixth aspect of the present invention, wherein the temperature sensor detects the temperature of the exhaust air in the exhaust air passage on the exhaust air flow downstream side of the heat exchange element.

Herein, because a temperature sensor is provided that detects the temperature of the exhaust air at the portion of the heat exchange element on the downstream side of the exhaust air flow, the temperature of the portion of the heat exchange element on the downstream side of the exhaust air flow can be accurately deduced.

PREFERRED EMBODIMENTS

First Embodiment

Figure 1:
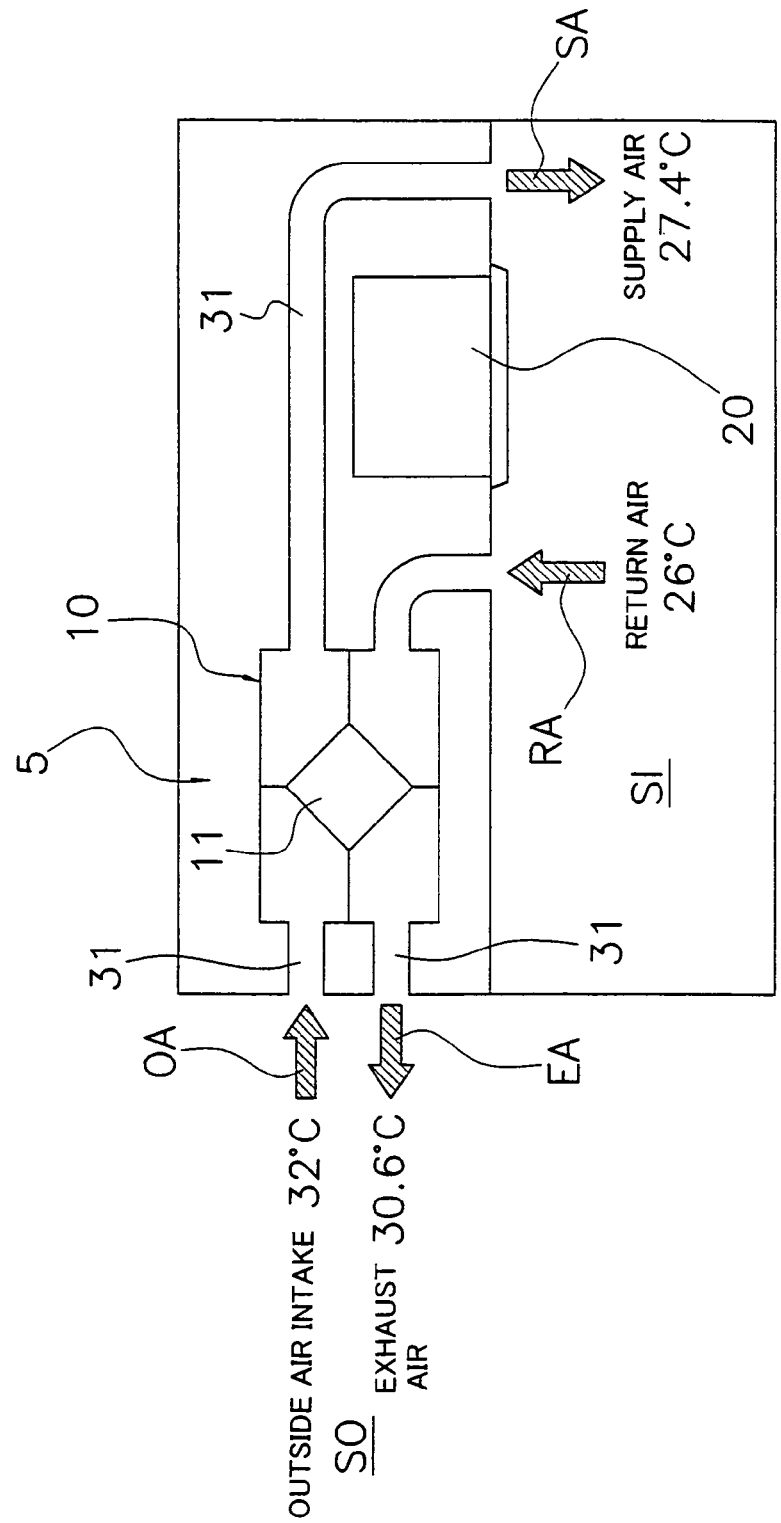
FIG. 1 is a general layout drawing of the heat exchanger unit.

The heat exchanger unit 5 according to one embodiment of the present invention is linked to an air conditioner 20 or operates independently, and is installed in order to ventilate buildings and various facilities. As shown in FIG. 1, the heat exchanger unit 5 according to the present embodiment is installed in places like above the ceiling of an indoor space SI that is to be ventilated inside a building, and the duct 31 links the indoor space SI to the outdoor space SO outside the building. The heat exchanger unit 5 exchanges heat between the return air RA from the indoor space SI and the outside air OA by the heat exchange element 11, discharges the return air RA to the outdoor space SO (exhaust air EA), and then delivers post heat-exchanged outside air OA into the indoor space SI as supply air SA. In addition to this type of heat exchange and ventilation operation, the heat exchanger unit 5 can also perform the usual ordinary ventilation operation by using a bypass passage.

Constitution

Figure 2:
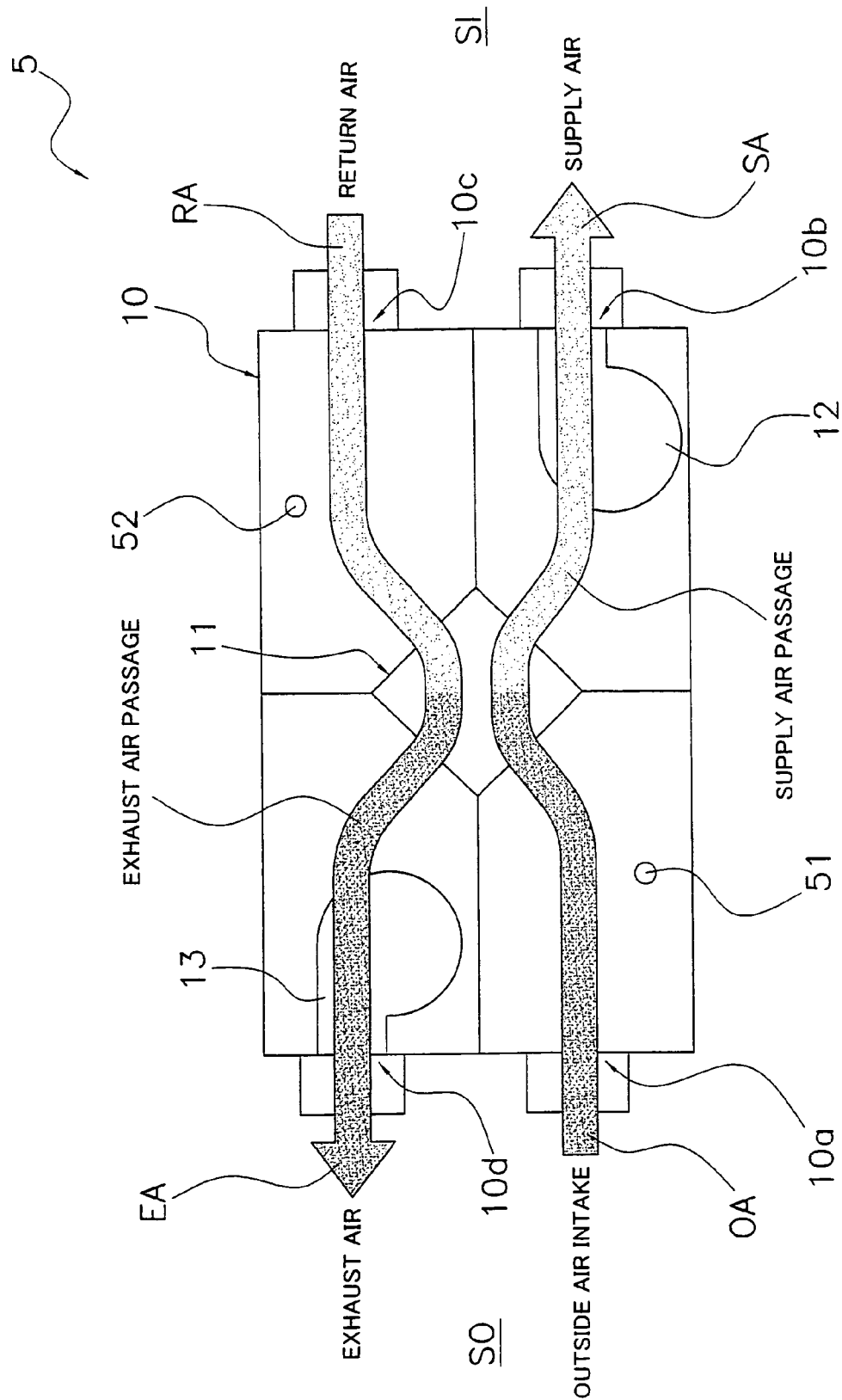
FIG. 2 is a schematic drawing of the constitution of the heat exchanger unit.

As shown in FIG. 2, the heat exchanger unit 5 principally comprises a casing 10, which includes a supply air passage and an exhaust air passage; a heat exchange element 11 housed in the center of the inside of the casing 10; a supply air fan 12; an exhaust air fan 13; and a control unit (not shown).

The casing 10 is an approximate rectangular parallelepiped box that houses the heat exchange element 11, and has a first inlet 10a and second outlet 10d on the outdoor space SO side, and a second inlet 10b and a first outlet 10c on the indoor space SI side. The supply air passage is a passage that extends from the first inlet 10a to the second inlet 10b via the heat exchange element 11. The exhaust air passage is a passage that extends from the first outlet 10c to the second outlet 10d via the heat exchange element 11.

The heat exchange element 11 is a so-called total heat exchanger, having a structure wherein the mutually orthogonal flow passages are alternately layered. The flow passage in one of the directions is incorporated in the supply air passage inside the casing 10, and the flow passage in the other direction is incorporated in the exhaust air passage inside the casing 10.

The supply air fan 12 is arranged on the downstream end of the supply air passage, and is operated so that the outside air OA from the first inlet 10a flows into the casing 10. In addition, the exhaust air fan 13 is arranged downstream of the exhaust air passage, and is operated so that the air (return air) RA inside the indoor space SI that is to be ventilated flows into the inside of the casing 10 from the first outlet 10c.

In addition, although omitted from FIG. 2, the heat exchanger unit 5 is provided with a bypass passage used when performing ordinary ventilation instead of heat exchange and ventilation. The damper (not shown) switches between the passage through the heat exchange element 11 and the bypass passage.

Furthermore, the heat exchanger unit 5 is equipped with two temperature sensors 51, 52 for judging whether to perform heat exchange and ventilation, or ordinary ventilation. As shown in FIG. 2, the temperature sensor 51 is arranged at a location where it can detect the temperature of the outside air OA (namely, the outside air temperature), before it passes through the heat exchange element 11. Specifically, the temperature sensor 51 is arranged between the first inlet 10a of the supply air passage inside the casing 10 and the heat exchange element 11. In addition, the temperature sensor 52 is arranged at a location where it can detect the temperature of the return air RA, namely the indoor temperature, before it passes through the heat exchange element 11. Specifically, the temperature sensor 52 is arranged between the first outlet 10c of the exhaust air passage inside the casing 10 and the heat exchange element 11.

Furthermore, the detection results of the temperature sensor 51, which detects the outside air temperature, are used as a condition when the control unit execute the freeze inhibit control modes as described later.

Control

The control unit of the heat exchanger unit 5 controls the operation of the supply air fan 12 and the exhaust air fan 13 based on factors like the detection results of the temperature sensors 51, 52.

Normal Ventilation Control Mode

The control unit of the heat exchanger unit 5 executes normal ventilation control mode based on the indoor temperature and the outside air temperature detected by the temperature sensors 51, 52. In cases where there is a linked air conditioner 20, the normal ventilation control mode is executed taking the operating status of the air conditioner 20 into consideration. In the normal ventilation control mode, the heat exchanger unit 5 switches between the heat exchange and ventilation operation and the ordinary ventilation operation.

When the supply air fan 12 and exhaust air fan 13 are operated and operation of the heat exchanger unit 5 starts in heat exchange and ventilation operation, the return air RA inside the indoor space SI is sucked into the casing 10, passes through the heat exchange element 11, changes into exhaust air EA, and is discharged from inside the casing 10 to the outdoor space SO. In addition, the outside air OA of the outdoor space is taken into the casing 10, passes through the heat exchange element 11, changes into supply air SA, and is discharged from the heat exchanger unit 5 to the indoor space SI.

Heat exchange and ventilation operation varies according to the operating conditions, such as cooling in the summertime, heating in the wintertime, cooling when the temperature of the outdoor space SO is lower than the indoor space SI, and heating when the temperature of the outdoor space SO is higher than the indoor space SI; the following describes one example of such operation.

In a case where the indoor space SI is heated in the wintertime to 20° C. by the air conditioner 20, the heat exchanger unit 5 exchanges heat between the 20° C. return air RA and the 0° C. outside air OA, operates the supply air fan 12, inserts the 15° C. supply air SA into the indoor space SI, operates the exhaust air fan 13, and discharges the 5° C. exhaust air EA into the atmosphere (outdoor space SO). Thereby, the heating operation duty cycle of the air conditioner 20 decreases, and energy consumption is reduced.

In addition, if the control unit of the heat exchanger unit 5 judges from the detection results of the temperature sensors 51, 52 that more energy would be saved by performing ordinary ventilation instead of the abovementioned heat exchange and ventilation, it switches the damper (not shown), and performs ordinary ventilation operation using the bypass passage. In ordinary ventilation operation, the outside air OA, whose heat is not exchanged with the return air RA, is taken into the indoor space SI.

Freeze Inhibit Control Modes

To inhibit freezing of the heat exchange element 11 when the outside air temperature falls below −10° C., the control unit of the heat exchanger unit 5 executes two different freeze inhibit control modes depending on the outside air temperature. These two freeze inhibit control modes are the first freeze inhibit control mode and the second freeze inhibit control mode.

The first freeze inhibit control mode inhibits freezing of the heat exchange element if the outside air temperature falls below −10° C. In the first freeze inhibit control mode, the exhaust air fan 13 is continuously operated, and the supply air fan 12 is stopped for the first 15 minutes of every 60 minutes; this operation is performed repetitively, and is hereinafter referred to as the first operational mode.

In cases where the outside air temperature falls below −15° C., the second freeze inhibit control mode inhibits freezing of the heat exchange element more strongly than the first freeze inhibit control mode. In the second freeze inhibit control mode, the supply air fan 12 and the exhaust air fan 13 are operated intermittently. To explain this more concretely, in the second freeze inhibit control mode, the supply air fan 12 and the exhaust air fan 13 are halted for 60 minutes, and then operation is restarted for just 5 minutes; this operation is performed repetitively, and is hereinafter referred to as the second operational mode.

Figure 3:
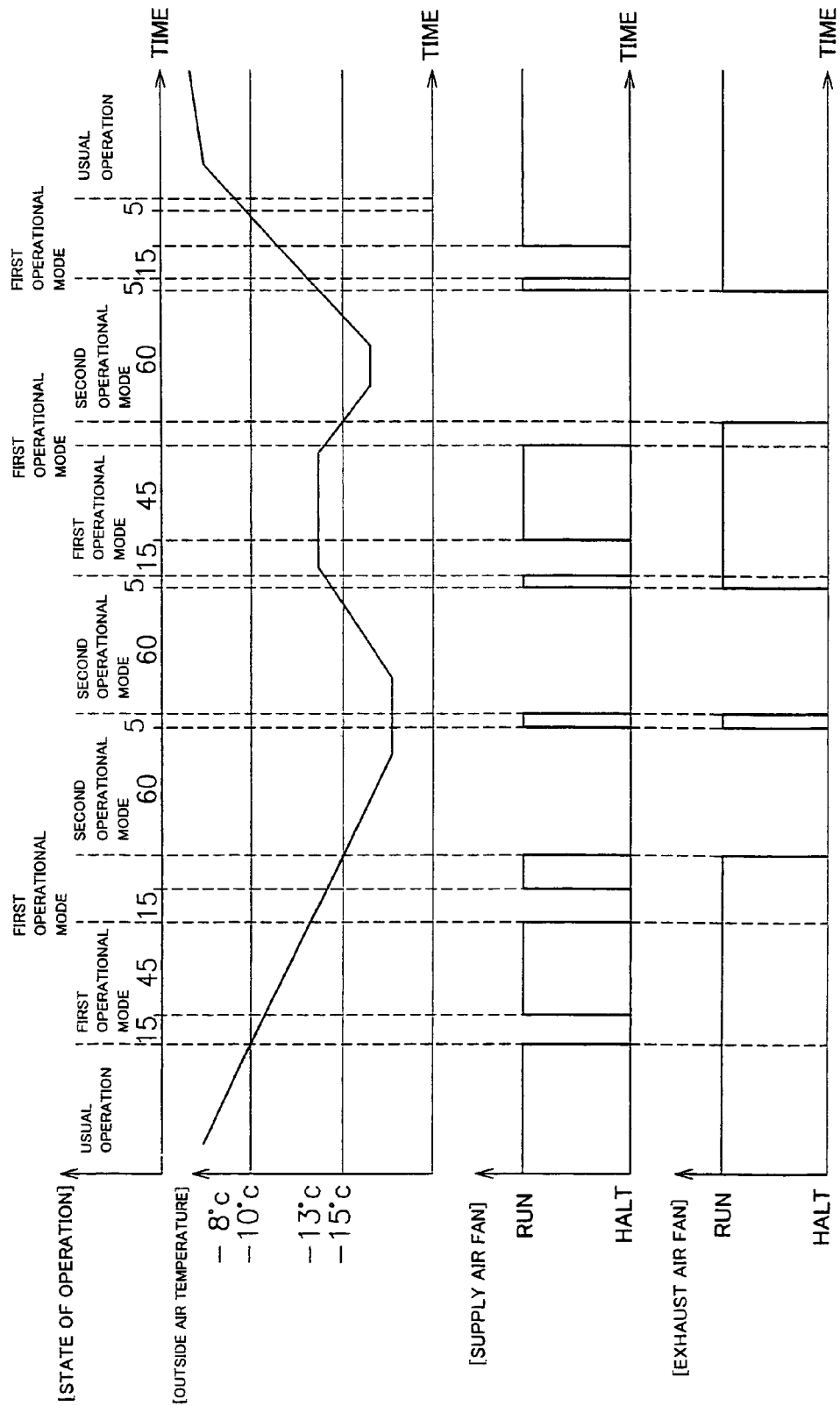
FIG. 3 shows the operation status of the heat exchanger unit with respect to the outside air temperature.

The following explains, in reference to FIG. 3, how the operating conditions change when using the two freeze inhibit control modes.

During the usual ventilation operation (herein, heat exchange and ventilation operation because the outside air temperature is low), the temperature sensor 51 continuously monitors the outside air temperature; the first freeze inhibit control mode is executed when the outside air temperature falls below −10° C. Thereby, intermittent operation of just the supply air fan 12 begins (first operational mode).

During the first operational mode, the outside air temperature is continuously monitored, including the 15 minutes when the supply air fan 12 is halted. Because the cold outside air OA does not pass through the heat exchange element 11 while the supply air fan 12 is halted in the first operational mode, cooling of the heat exchange element 11 is alleviated.

However, if the outside air temperature is too low, it is conceivable that freezing of the heat exchange element 11 cannot be inhibited in the first operational mode. Therefore, when the outside air temperature falls below −15° C., the control unit halts execution of the first freeze inhibit control mode and executes the second freeze inhibit control mode instead. The shift from the first freeze inhibit control mode to the second freeze inhibit control mode is forced, even if the first operational mode is in progress.

The second operational mode repeats a cycle of 60 minutes of halting the supply air fan 12 and the exhaust air fan 13, followed by five minutes of operation. Thereby, because ventilation operation is halted continuously for 60 minutes, the indoor temperature rises during this time. Consequently, when operation of the exhaust air fan 13 is restarted, the warm indoor return air RA passes through the heat exchange element 11, thereby inhibiting freezing of the heat exchange element 11. Furthermore, in the second operational mode, the outside air temperature is monitored by the temperature sensor 51 during the five minutes when the supply air fan 12 and the exhaust air fan 13 are operated.

If the result of monitoring the outside air temperature in the second operational mode indicates that the outside air temperature is rising and that the outside air temperature continues to be −13° C. or greater during five minutes of monitoring, the control unit shifts from the second freeze inhibit control mode to the first freeze inhibit control mode after operation of the supply air fan 12 and the exhaust air fan 13 during those five minutes.

In addition, the outside air temperature is continuously monitored in the first operational mode, during which time the control unit judges whether to return to the usual ventilation operation based on the continuous state of the outside air temperature during 45 minutes of operation of the supply air fan 12. Concretely, if the outside air temperature is higher than −8° C. for five minutes or longer during 45 minutes of operation of the supply air fan 12 in the first freeze inhibit control mode, the control unit promptly shifts from the first operational mode to the usual ventilation operation.

Characteristics of the Heat Exchanger Unit

In the heat exchanger unit 5 of the present embodiment, the control unit monitors the outside air temperature detected by the temperature sensor 51; as in the conventional art, when the outside air temperature falls below a predetermined level (−10° C.), the control unit executes the first freeze inhibit control mode, which inhibits freezing of the heat exchange element 11; and when the outside air temperature falls below −15° C., the control unit executes the second freeze inhibit control mode, which more strongly inhibits freezing.

Specifically, in the first freeze inhibit control mode, the first operational mode is executed, which temporarily halts only the supply air fan 12; in the second freeze inhibit control mode, the second operational mode is executed, which temporarily halts both the supply air fan 12 and the exhaust air fan 13. In the latter second operational mode, because a time span (60 minutes) arises in which both the supply air and exhaust air are stopped, the temperature of the indoor space SI rises and, when the exhaust air is subsequently started, the comparatively warm return air RA passes through the heat exchange element 11, effectively inhibiting freezing of the heat exchange element 11.

Using these two differing operational modes to effect freeze inhibit control increases the degree that freezing of the heat exchange element 11 is inhibited; namely, even if the outside air temperature falls as far as the temperature (−15° C.) where freezing of the heat exchange element 11 is insufficiently inhibited just by repetitively executing the first operational mode after the temperature falls below −10° C., the second operational mode is executed by the second freeze inhibit control mode. Consequently, the heat exchanger unit 5 appropriately inhibits freezing of the heat exchange element 11 even in cold-climate regions.

Second Embodiment

To provide a significantly different degree of inhibiting freezing of heat exchange element 11 between the first operational mode in the first freeze inhibit control mode and the second operational mode in the second freeze inhibit control mode in the above first embodiment, the first operational mode temporarily halts just the supply air fan 12, whereas the second operational mode temporarily halts both the supply air fan 12 and the exhaust air fan 13.

However, a case is also conceivable wherein, depending on the low-temperature resistance of the heat exchange element 11 and the ability of the air conditioner 20 to warm the indoor space SI, the abovementioned powerful second operational mode is not needed. In such a case, it is also possible to set the following type of first freeze inhibit control mode and second freeze inhibit control mode.

In the second embodiment, just the supply air fan 12 is temporarily stopped for a predetermined percentage of time in the first freeze inhibit control mode and the second freeze inhibit control mode. In other words, the exhaust air fan 13 runs continuously in the first freeze inhibit control mode as well as in the second freeze inhibit control mode. Further, during operation in the second freeze inhibit control mode, the percentage of time that the supply air fan 12 is halted is greater than during operation in the first freeze inhibit control mode. For example, with operation in the first freeze inhibit control mode, the allocation is 15 minutes of halt time and 45 minutes of operation time for the supply air fan 12; in contrast, during operation in the second freeze inhibit control mode, the allocation is 50 minutes of halt time and 10 minutes of operation time for the supply air fan 12.

Third Embodiment

In the abovementioned first embodiment, the start and cancellation of the first freeze inhibit control mode and the second freeze inhibit control mode are judged based only on the temperature detected by the temperature sensor 51, which detects the outside air temperature; however, that judgment may also be made taking into consideration the conditions of the temperature detected by the temperature sensor 52, which detects the indoor temperature. In this case, the risk of freezing of the heat exchange element 11 can be more accurately estimated, making it possible to more appropriately time the start and cancellation of the first freeze inhibit control mode and the second freeze inhibit control mode.

Fourth Embodiment

Figure 4:
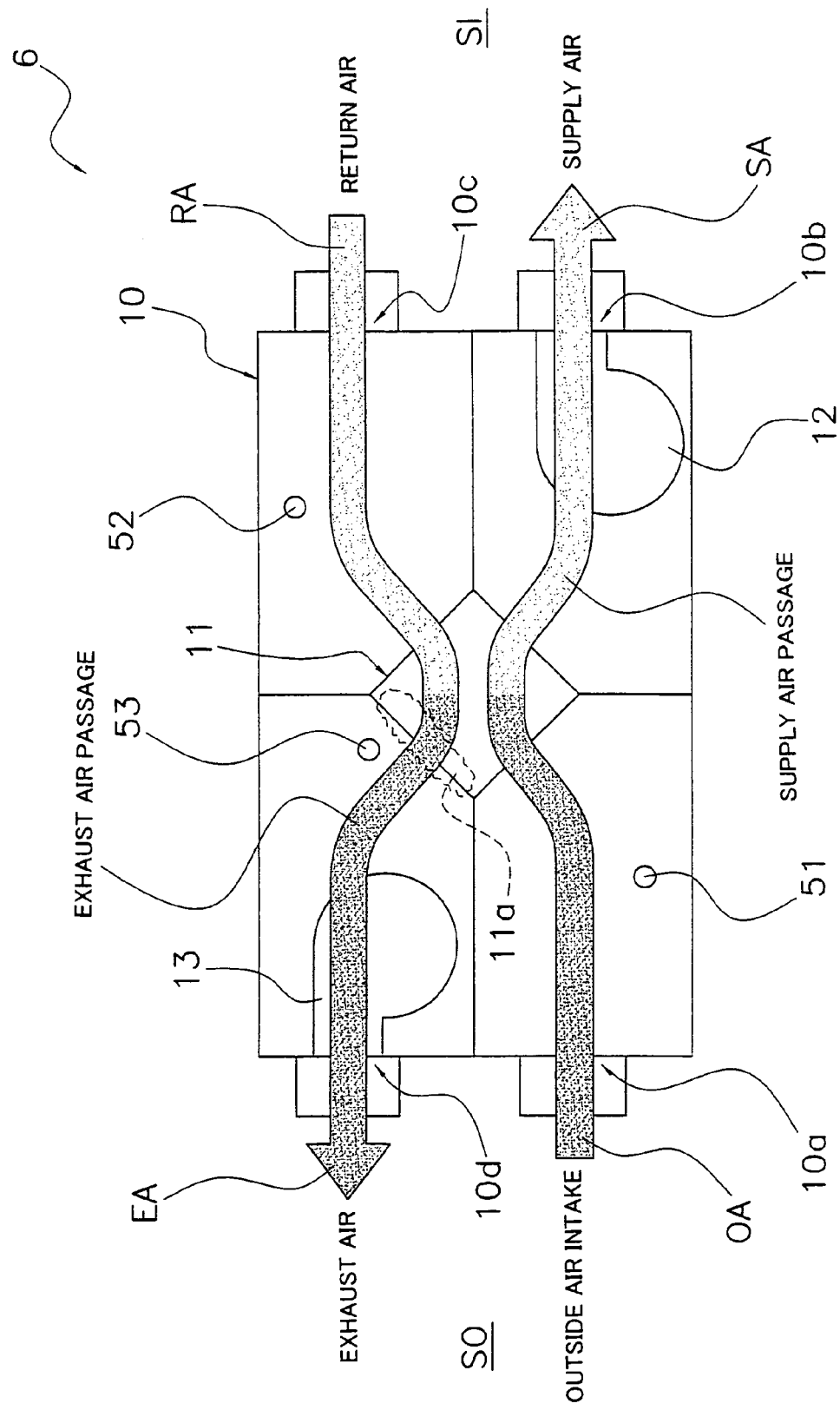
FIG. 4 is a schematic drawing of the constitution of the heat exchanger unit according to the fourth embodiment.

The heat exchanger unit 6 according to one embodiment of the present invention, shown in FIG. 4, is installed for ventilating buildings and various facilities, and is linked to an air conditioner or operated independently. In the heat exchange and ventilation operational mode, the heat exchanger unit 6 exchanges heat between the return air RA from the indoor space SI and the exhaust air EA by the heat exchange element 11, discharges the return air RA to the outdoor space SO (exhaust air EA), and delivers the post-heat exchanged outside air OA into the indoor space SI as supply air SA. In addition to this type of heat exchange and ventilation operational mode, the heat exchanger unit 6 can also perform the usual ordinary ventilation operation using the bypass passage.

Constitution

As shown in FIG. 4, the heat exchanger unit 6 principally comprises a casing 10, which includes a supply air passage and an exhaust air passage; a heat exchange element 11 housed in the center of the inside of the casing 10; a supply air fan 12; an exhaust air fan 13; and a control unit (not shown).

The constitution of the casing 10, the heat exchange element 11, and the supply air fan 12 are the same as in the first embodiment.

In addition, although omitted from FIG. 4, the heat exchanger unit 6 is provided with a bypass passage that is used when performing ordinary ventilation instead of heat exchange and ventilation. The bypass passage and the passage that passes through the heat exchange element 11 are switched by a damper (not shown).

Furthermore, the heat exchanger unit 6 is equipped with two temperature sensors 51, 52 for judging whether to perform heat exchange and ventilation, or ordinary ventilation; and a temperature sensor 53 for judging whether to execute a freeze inhibit control mode discussed later. The temperature sensor 51 and the temperature sensor 52 are arranged in the same manner as the first embodiment. Furthermore, as shown in FIG. 4, the temperature sensor 53 is provided to detect the temperature of a portion 11a of the heat exchange element 11 on the downstream side of the exhaust air flow, and detects the temperature of the exhaust air EA (hereinafter, the exhaust air temperature). Specifically, the temperature sensor 53 is arranged in the exhaust air passage inside the casing 10 between the heat exchange element 11 and the second outlet 10d Control The control unit of the heat exchanger unit 6 controls operation of the supply air fan 12 and the exhaust air fan 13 based on factors like the detection results of the temperature sensors 51, 52, and 53.

Normal Ventilation Control Mode

The control unit of the heat exchanger unit 6 executes the normal ventilation control mode in the same manner as the control unit of the heat exchanger unit 5 in the first embodiment.

Freeze Inhibit Control Modes

Because the control unit of the heat exchanger unit 6 inhibits freezing of the heat exchange element 11 when the exhaust air temperature detected by the temperature sensor 53 falls below 0° C., two differing freeze inhibit control modes are executed depending on the exhaust air temperature. These two freeze inhibit control modes are the first freeze inhibit control mode and the second freeze inhibit control mode.

The first freeze inhibit control mode inhibits freezing of the heat exchange element 11 if the exhaust air temperature falls below 0° C. In the first freeze inhibit control mode, the exhaust air fan 13 is continuously operated, and the supply air fan 12 is halted for the first 15 minutes of every 60 minutes; this operation is performed repetitively, and is hereinafter referred to as the first operational mode.

The second freeze inhibit control mode inhibits freezing of the heat exchange element more strongly than the first freeze inhibit control mode in cases where the exhaust air temperature falls below −3° C. In the second freeze inhibit control mode, the supply air fan 12 and the exhaust air fan 13 are operated intermittently. To explain this more concretely, in the second freeze inhibit control mode, the supply air fan 12 and the exhaust air fan 13 are halted for 60 minutes, and then operation is restarted for just five minutes; this operation is performed repetitively, and is hereinafter referred to as the second operational mode.

The following explains how the operating conditions change when using the two freeze inhibit control modes.

During the usual ventilation operation (herein, heat exchange and ventilation operation because the outside air temperature is low), the temperature sensor 53 continuously monitors the exhaust air temperature; the first freeze inhibit control mode is executed when the exhaust air temperature falls below 0° C. Thereby, intermittent operation of just the supply air fan 12 begins (first operational mode).

During the first operational mode, the exhaust air temperature is continuously monitored, including the 15 minutes when the supply air fan 12 is halted. Because the cold outside air OA does not pass through the heat exchange element 11 while the supply air fan 12 is halted in the first operational mode, cooling of the heat exchange element 11 is alleviated.

However, if the exhaust air temperature further decreases, it is conceivable that freezing of the heat exchange element 11 cannot be inhibited in the first operational mode. Therefore, when the exhaust air temperature falls below −3° C., the control unit halts execution of the first freeze inhibit control mode and executes the second freeze inhibit control mode instead. The shift from the first freeze inhibit control mode to the second freeze inhibit control mode is forced, even if the first operational mode is in progress.

The second operational mode repetitively performs a cycle of halting the supply air fan 12 and the exhaust air fan 13 for 60 minutes, and then operating them for five minutes. Thereby, because ventilation operation is halted continuously for 60 minutes, the indoor temperature rises during this time. Consequently, when operation of the exhaust air fan 13 is restarted, the warm indoor return air RA passes through the heat exchange element 11, thereby inhibiting freezing of the heat exchange element 11. Furthermore, in the second operational mode, the exhaust air temperature is monitored by the temperature sensor 53 during the five minutes when the supply air fan 12 and the exhaust air fan 13 are operated.

If the result of monitoring the exhaust air temperature in the second operational mode indicates that the exhaust air temperature is rising and that the exhaust air temperature continues to be 0° C. or greater during five minutes of monitoring, the control unit shifts from the second freeze inhibit control mode to the first freeze inhibit control mode after operating the supply air fan 12 and the exhaust air fan 13 for those five minutes.

In addition, the exhaust air temperature is continuously monitored during the first operational mode, during which time the control unit judges whether to return to the usual ventilation operation based on the continuous state of the exhaust air temperature during 45 minutes of operation of the supply air fan 12. Concretely, if the exhaust air temperature is higher than 2° C. for five minutes or longer during the 45 minutes of operation of the supply air fan 12 in the first freeze inhibit control mode, the control unit promptly shifts from the first operational mode to the usual ventilation operation.

Characteristics of the Heat Exchanger Unit (1)

Because the humidity of the indoor space SI is generally higher than the outdoor space SO, a freezing phenomenon occurs at the element exhaust air downstream portion 11a, as shown in FIG. 4, if the heat exchange element 11, which forms a portion of the supply air passage and the exhaust air passage, freezes. In contrast, in the conventional art, the judgment about whether to perform operations that inhibit freezing of the heat exchange element 11 is made by detecting the temperature of the outside air that passes through the supply air passage and comparing that temperature with a predetermined level. Nevertheless, because the conventional art is unable to judge based only on the outside air temperature whether the heat exchange element 11 will freeze, it is therefore preferable to make such judgments based on the temperature of the element exhaust air downstream portion 11a of the heat exchange element 11, which freezes easily.

Taking this into consideration, in the heat exchanger unit 6 of the present embodiment, a temperature sensor 53 is newly provided, and the temperature of the element exhaust air downstream portion 11a of the heat exchange element 11 is indirectly detected by the detection of the temperature of the exhaust air EA (exhaust air temperature) that passed through the element exhaust air downstream portion 11a.

Thereby, enabling the risk of freezing of the heat exchange element 11 to be judged more accurately reduces malfunctions like switching to operations that execute a freeze inhibit control mode when not needed, or not executing a freeze inhibit control mode despite the fact that the heat exchange element 11 is freezing, thus enabling freezing of the heat exchange element 11 to be appropriately inhibited in cold-climate regions.

(2)

In the heat exchanger unit 6 of the present embodiment, the control unit monitors the exhaust air temperature detected by the temperature sensor 53; when the exhaust air temperature falls below a predetermined level (0° C.), the control unit executes the first freeze inhibit control mode, which inhibits freezing of the heat exchange element 11; and when the exhaust air temperature falls below −3° C., the control unit executes the second freeze inhibit control mode, which more strongly inhibits freezing.

Specifically, in the first freeze inhibit control mode, the first operational mode is executed, which temporarily halts only the supply air fan 12; in the second freeze inhibit control mode, the second operational mode is executed, which temporarily halts both the supply air fan 12 and the exhaust air fan 13. In the latter second operational mode, because a time span (60 minutes) arises during which both the supply air and exhaust air are stopped, the temperature of the indoor space SI rises and, when the exhaust air is subsequently started, the comparatively warm return air RA passes through the heat exchange element 11, effectively inhibiting freezing of the heat exchange element 11.

Using these two differing operational modes to effect freeze inhibit control increases the degree that freezing of the heat exchange element 11 is inhibited; namely, even if the exhaust air temperature falls as far as the temperature (−3° C.) where freezing of the heat exchange element 11 is insufficiently inhibited by just repetitively executing the first operational mode after the temperature falls below 0° C., the second operational mode is executed in the second freeze inhibit control mode. Consequently, the heat exchanger unit 6 appropriately inhibits freezing of the heat exchange element 11 even in cold-climate regions.

Modified Example of the Fourth Embodiment

Instead of the abovementioned temperature sensor 53 that detects the temperature of the exhaust air that passed through the heat exchange element 11, it is also possible to use a temperature sensor that directly detects the temperature of the portion 11a of the heat exchange element 11 on the downstream side of the exhaust air flow.

Industrial Field of Application

Use of the heat exchanger unit according to the present invention enables the appropriate inhibition of the freezing of the heat exchange element even in cold-climate regions because, in addition to the first freeze inhibit control mode that is executed when the outside air temperature falls below a first level, it is newly provided with a second freeze inhibit control mode that is executed when the outside air temperature falls below a second level.

What is claimed is:

1. A heat exchanger unit adapted to be arranged between an indoor space and an outdoor space, and that can perform heat exchange and ventilation, comprising:
   a heat exchange element;
   a supply air passage that is routed via said heat exchange element;
   a supply air fan disposed in said supply air passage;
   an exhaust air passage that is routed via said heat exchange element;
   an exhaust air fan disposed in said exhaust air passage;
   a temperature sensor that detects an outside air temperature of said outdoor space; and
   a control unit operatively coupled to said heat exchange element to execute a first freeze inhibit control mode if the outside air temperature falls below a first level, and a second freeze inhibit control mode if said outside air temperature falls below a second level, which is lower than said first level, said control unit inhibiting freezing of said heat exchange element in said first freeze inhibit control mode,
   said control unit intermittently operating said supply air fan in said first freeze inhibit control mode, and intermittently operating said supply air fan and said exhaust air fan in said second freeze inhibit control mode.

2. The heat exchanger unit according to claim 1, wherein said control unit intermittently operates said supply air fan in said first freeze inhibit control mode, and intermittently operates said supply air fan in said second freeze inhibit control mode with a percentage of halt time greater than that of intermittent operation in said first freeze inhibit control mode.

3. The heat exchanger unit according to claim 1, further comprising:
- a casing that houses said heat exchange element and has a first inlet and a second outlet on the outdoor space side, and a second inlet and a first outlet on the indoor space side; wherein
- said supply air passage extends in said casing from said first inlet to said second inlet via said heat exchange element;
- said exhaust air passage extends in said casing from said first outlet to said second outlet via said heat exchange element; and
- said temperature sensor is arranged between said first inlet of said supply air passage and said heat exchange element.

* * * * *